United States Patent
Androsov et al.

(10) Patent No.: US 9,567,524 B2
(45) Date of Patent: Feb. 14, 2017

(54) POLYMERIZABLE LIQUID CRYSTAL COMPOUND, AND COMPENSATION FILM, ANTIREFLECTIVE FILM, AND DISPLAY DEVICE INCLUDING THE SAME

(71) Applicant: SAMSUNG ELECTRONICS CO., LTD., Suwon-si, Gyeonggi-do (KR)

(72) Inventors: Dmitry Androsov, Suwon-si (KR); Sang Ho Park, Anyang-si (KR); Won Cheol Jung, Seoul (KR); Jung Im Han, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/746,913

(22) Filed: Jun. 23, 2015

(65) Prior Publication Data

US 2016/0230090 A1     Aug. 11, 2016

(30) Foreign Application Priority Data

Feb. 6, 2015    (KR) .................. 10-2015-0018756

(51) Int. Cl.
     *C07C 69/76*      (2006.01)
     *C09K 19/20*      (2006.01)
     *C09K 19/04*      (2006.01)

(52) U.S. Cl.
     CPC ....... *C09K 19/2014* (2013.01); *C09K 19/2007* (2013.01); *C09K 2019/0448* (2013.01); *C09K 2019/2078* (2013.01)

(58) Field of Classification Search
     CPC .................. C09K 19/2014; C09K 2019/2035
     See application file for complete search history.

(56) References Cited

U.S. PATENT DOCUMENTS

| | | | |
|---|---|---|---|
| 4,983,479 A | 1/1991 | Broer et al. | |
| 5,042,925 A | 8/1991 | Broer et al. | |
| 5,188,760 A | 2/1993 | Hikmet et al. | |
| 5,210,630 A | 5/1993 | Heynderickx et al. | |
| 5,793,456 A | 8/1998 | Broer et al. | |
| 6,090,308 A | 7/2000 | Coates et al. | |
| 7,473,446 B2 | 1/2009 | Ito et al. | |
| 2006/0035036 A1* | 2/2006 | Yim .......................... | C09J 9/02 428/1.1 |
| 2011/0147657 A1 | 6/2011 | Hirai et al. | |
| 2011/0178200 A1 | 7/2011 | Parri et al. | |

FOREIGN PATENT DOCUMENTS

| | | |
|---|---|---|
| EP | 0423881 | 4/1991 |
| EP | 0428213 | 5/1991 |
| EP | 0451905 | 10/1991 |
| EP | 0331233 | 4/1997 |
| EP | 0606940 | 4/1999 |
| EP | 2303987 | 3/2014 |
| GB | 2297549 | 8/1996 |
| JP | 200320479 | 1/2003 |
| JP | 2009149620 | * 7/2009 |
| KR | 1020060014357 | 2/2006 |
| KR | 1020110001329 | 1/2011 |
| KR | 1020110010815 | 2/2011 |
| KR | 1020110094944 | 8/2011 |
| KR | 1020140107975 | 9/2014 |
| WO | 9322397 | 11/1993 |

OTHER PUBLICATIONS 620 translated, 2009.*
Dong Won Kwon, et al., "Film compensation of twisted nematic liquid crystal display using a rod-like reactive mesogen", Current Applied Physics 11 (2011) 725-730.
Gerold Schmitt, et al., "New Liquid crystalline di- and tetra-acrylates for network formation", Liquid Crystals, 2001, vol. 28, No. 11, 1611-1621.

* cited by examiner

*Primary Examiner* — Yevegeny Valenrod
*Assistant Examiner* — Blaine G Doletski
(74) *Attorney, Agent, or Firm* — Cantor Colburn LLP

(57) ABSTRACT

A polymerizable liquid crystal compound is represented by Chemical Formula 1:

Chemical Formula 1

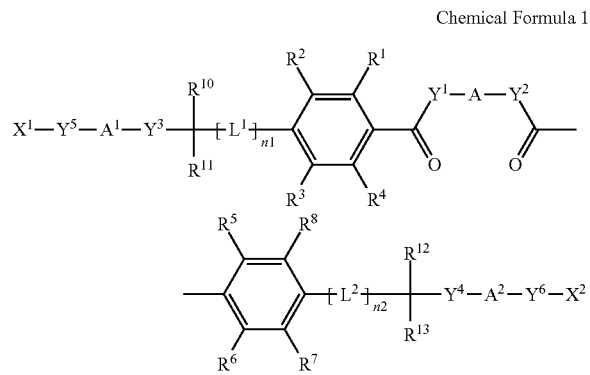

wherein, in Chemical Formula 1 groups and variables are the same as defined in the detailed description.

7 Claims, 8 Drawing Sheets

POLYMERIZABLE LIQUID CRYSTAL COMPOUND, AND COMPENSATION FILM, ANTIREFLECTIVE FILM, AND DISPLAY DEVICE INCLUDING THE SAME

CROSS-REFERENCE TO RELATED APPLICATION

This application claims priority to Korean Patent Application No. 10-2015-0018756 filed in the Korean Intellectual Property Office on Feb. 6, 2015, and all the benefits accruing therefrom under 35 U.S.C. §119, the content of which is incorporated herein in its entirety by reference.

BACKGROUND

1. Field

This disclosure relates to a polymerizable liquid crystal compound, and a compensation film, an antireflective film, and a display device including the same.

2. Description of the Related Art

A display device such as a liquid crystal display (LCD) and an organic light emitting diode (OLED) display includes a polarizing film attached to the outside of the display panel. The polarizing film only transmits light of a specific wavelength and absorbs or reflects other light, thus controlling the direction of incident light on the display panel or light emitted from the display panel.

The polarizing film generally includes a polarizer and a protective layer for the polarizer. The polarizer may be formed of, for example, polyvinyl alcohol (PVA), and the protective layer may be formed of, for example, triacetyl cellulose (TAC).

The polarizing film may be bonded with a compensation film, and thus, may play a role of an antireflective film to prevent reflection of light flowing in from the outside. The antireflective film may be formed on one side or both sides of a display device and may have an influence on visibility of the display device.

On the other hand, an optical film including a liquid crystal composition containing a liquid crystalline compound has recently been used in an optically compensating a liquid crystal display (LCD) to enlarge its viewing angle.

To form an optical film, this liquid crystalline compound is dissolved in an organic solvent and then coated. However, when the liquid crystalline compound has low solubility in an organic solvent, surface characteristics of the optical film may be deteriorated.

Thus, there remains a need for a polymerizable liquid crystal compound having excellent solubility in an organic solvent in order to produce a film having improved film workability and excellent stability of a liquid crystal phase.

SUMMARY

An embodiment provides a polymerizable liquid crystal compound having excellent solubility in an organic solvent in order to produce a film having improved film workability and excellent stability of a liquid crystal phase.

Another embodiment provides a compensation film including the polymerizable liquid crystal compound.

Yet another embodiment provides an antireflective film including the compensation film.

Still another embodiment provides a display device including the antireflective film.

An embodiment provides a polymerizable liquid crystal compound represented by Chemical Formula 1.

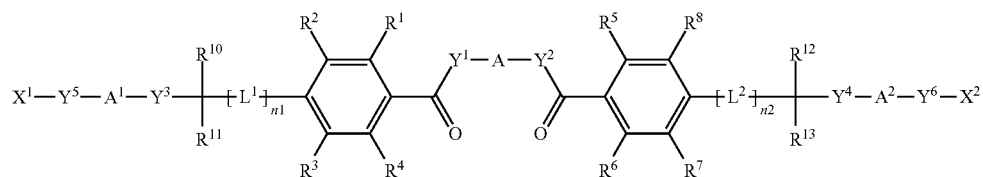

Chemical Formula 1

In Chemical Formula 1

A is a substituted or unsubstituted divalent aromatic hydrocarbon group or a substituted or unsubstituted divalent alicyclic hydrocarbon group, $L^1$ and $L^2$ are each independently a substituted or unsubstituted divalent aliphatic hydrocarbon group, a substituted or unsubstituted divalent aromatic hydrocarbon group, a substituted or unsubstituted divalent alicyclic hydrocarbon group, or a combination thereof, n1 and n2 are each independently an integer of 0 or 1, $A^1$ and $A^2$ are each independently a substituted or unsubstituted divalent aliphatic hydrocarbon group, $R^1$ to $R^8$ are independently hydrogen, a halogen, a cyano group, a nitro group, an aldehyde group, an amine group, a carboxyl group, a substituted or unsubstituted C1 to C20 alkyl group, a substituted or unsubstituted C2 to C20 alkenyl group, a substituted or unsubstituted C2 to C20 alkynyl group, a substituted or unsubstituted C2 to C20 ketone group —C(=O)$R^a$, a substituted or unsubstituted C2 to C20 ester group —C(=O)O$R^b$, a substituted or unsubstituted C3 to C30 cycloalkyl group, a substituted or unsubstituted C6 to C30 aryl group, —S(=O)$R^c$, —S(=O)O$R^d$, —S(=O)$_2R^e$, or —S(=O)$_2$O$R^f$ (wherein $R^a$ to $R^f$ are hydrogen, a C1 to C20 alkyl group, or a C6 to C30 aryl group), $R^{10}$ to $R^{13}$ are independently hydrogen, a halogen, a cyano group, a nitro group, an aldehyde group, a substituted or unsubstituted C1 to C20 alkyl group, a substituted or unsubstituted C2 to C20 alkenyl group, a substituted or unsubstituted C2 to C20 alkynyl group, a substituted or unsubstituted C2 to C20 ketone group —C(=O)$R^a$, a substituted or unsubstituted C2 to C20 ester group —C(=O)O$R^b$, a substituted or unsubstituted C3 to C30 cycloalkyl group, a substituted or unsubstituted C6 to C30 aryl group, —S(=O)$R^c$, —S(=O)O$R^d$, —S(=O)$_2R^e$, or —S(=O)$_2$O$R^f$ (wherein $R^a$ to $R^f$ are hydrogen, a C1 to C20 alkyl group, or a C6 to C30 aryl group), wherein at least one pair of substituents $R^{10}$ and $R^{11}$ and substituents $R^{12}$ and $R^{13}$ optionally forms a spiro structure, $Y^1$ and $Y^2$ are each independently —O—, —S—, or —N($R^a$)— (wherein $R^a$ is hydrogen, a C1 to C20 alkyl group, or a C6 to C30 aryl group), $Y^3$, $Y^4$, $Y^5$, and $Y^6$ are each independently a linking group selected from —O—, —S—, —N($R^a$)—, —C(=O)—, —C(=O)O—, —OC(=O)—, —OC(=O)—, —C(=O)S—, —N($R^b$)C(=O)—, and —C(=O)N($R^c$)— (wherein $R^a$, $R^b$, and $R^c$ are each independently hydrogen, a C1 to C20 alkyl group, or a C6 to C30 aryl group) or a C2 to C20 alkylene group wherein non-adjacent —(CH$_2$)— is replaced by at least one of the linking groups, and $X^1$ and $X^2$ are each independently a polymerizable functional group.

Specific examples of the A may be a functional group represented by Chemical Formula 1-1.

Chemical Formula 1-1

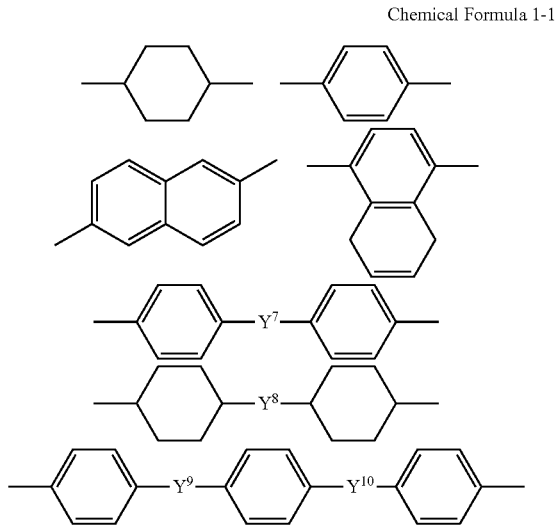

In Chemical Formula 1-1, any hydrogen of each cyclohexylene ring, phenylene ring, and naphthalene ring may be replaced by a halogen, a cyano group, a nitro group, an aldehyde group, an amine group, a carboxyl group, a substituted or unsubstituted C1 to C20 alkyl group, a substituted or unsubstituted C2 to C20 alkenyl group, a substituted or unsubstituted C2 to C20 alkynyl group, a substituted or unsubstituted C2 to C20 ketone group —C(=O)$R^a$, a substituted or unsubstituted C2 to C20 ester group —C(=O)O$R^b$, a substituted or unsubstituted C3 to C30 cycloalkyl group, a substituted or unsubstituted C6 to C30 aryl group, —S(=O)$R^c$, —S(=O)O$R^d$, —S(=O)$_2R^e$, or —S(=O)$_2$O$R^f$ (wherein $R^a$ to $R^f$ are hydrogen, a C1 to C20 alkyl group, or a C6 to C30 aryl group), at least one of non-adjacent —(CH$_2$)— of each cyclohexylene ring may be replaced by —O—, —S—, or —N($R^a$)— (wherein $R^a$ is hydrogen, a C1 to C20 alkyl group, or a C6 to C30 aryl group), and at least one of non-adjacent —CH= of each phenylene ring or naphthalene ring may be replaced by —N=, and $Y^7$, $Y^8$, $Y^9$, and $Y^{10}$ are independently a linking group selected from a single bond, —C($R^x$)=C($R^y$)— (wherein $R^x$ and $R^y$ are each independently hydrogen, a C1 to C20 alkyl group, or a C6 to C30 aryl group), —C≡C—, —O—, —S—, —N($R^a$)—, —C(=O)—, —C(=O)S—, —OC(=O)—, —OC(=O)—, —C(=O)S—, —N($R^b$)C(=O)—, and —C(=O)N($R^c$)— (wherein $R^a$ to $R^c$ are hydrogen, a C1 to C20 alkyl group, or a C6 to C30 aryl group) or a C2 to C20 alkylene group wherein non-adjacent —(CH$_2$)— is replaced by at least one of the linking groups.

In Chemical Formula 1-1, the substituted or unsubstituted C2 to C20 alkenyl group, or the substituted or unsubstituted C2 to C20 alkynyl group optionally replacing hydrogen in each cyclohexylene ring, phenylene ring, and naphthalene ring, is independently —C($R^x$)=C($R^y$)($R^z$) or —C≡C($R^x$) wherein $R^x$, $R^y$, and $R^z$ are each independently hydrogen, a C1 to C20 alkyl group, or a C6 to C30 aryl group.

Specific examples of the $L^1$ and $L^2$ may be a functional group represented by Chemical Formula 1-2.

Chemical Formula 1-2

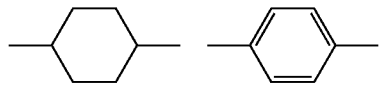

In Chemical Formula 1-2, any hydrogen of each cyclohexylene ring and phenylene ring may be replaced by a halogen, a cyano group, a nitro group, an aldehyde group, an amine group, a carboxyl group, a substituted or unsubstituted C1 to C20 alkyl group, a substituted or unsubstituted C2 to C20 alkenyl group, a substituted or unsubstituted C2 to C20 alkynyl group, a substituted or unsubstituted C2 to C20 ketone group —C(=O)$R^a$, a substituted or unsubstituted C2 to C20 ester group —C(=O)O$R^b$, a substituted or unsubstituted C3 to C30 cycloalkyl group, a substituted or unsubstituted C6 to C30 aryl group, —S(=O)$R^c$, —S(=O)O$R^d$, —S(=O)$_2R^e$, or —S(=O)$_2$O$R^f$ (wherein $R^a$ to $R^f$ are hydrogen, a C1 to C20 alkyl group, or a C6 to C30 aryl group), and at least one of non-adjacent —(CH$_2$)— of each cyclohexylene ring may be replaced by —O—, —S—, or —N($R^a$)— (wherein $R^a$ is hydrogen, a C1 to C20 alkyl group, or a C6 to C30 aryl group), and at least one of non-adjacent —CH= of each phenylene ring or naphthalene ring may be replaced by —N=.

The $A^1$ and $A^2$ are each independently (CRR'$_2$)$_n$ (wherein R and R' are independently hydrogen or a C1 to C10 alkyl group, and n is an integer of 1 to 10).

In Chemical Formula 1, specific examples of —C($R^{10}$)($R^{11}$)— and —C($R^{12}$)($R^{13}$)— may each be a functional group represented by Chemical Formula 1-3.

Chemical Formula 1-3

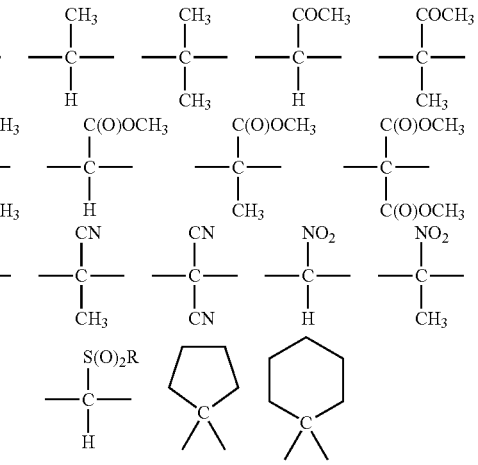

In Chemical Formula 1, the polymerizable functional group may be a substituted or unsubstituted C2 to C10 alkenyl group, a substituted or unsubstituted C2 to C10 alkynyl group, a substituted or unsubstituted oxetanyl group, a substituted or unsubstituted (meth)acryl group, a substituted or unsubstituted (meth)acryloyloxy group, a substituted or unsubstituted (meth)acryloylamino group, a substituted or unsubstituted (meth)acryloyl group, a substituted or unsubstituted maleoyl group, a substituted or unsubstituted epoxy group, or a substituted or unsubstituted epoxy cycloalkyl group.

Specific examples of the polymerizable functional group may be a functional group represented by Chemical Formulae (1-4a) to (1-4f).

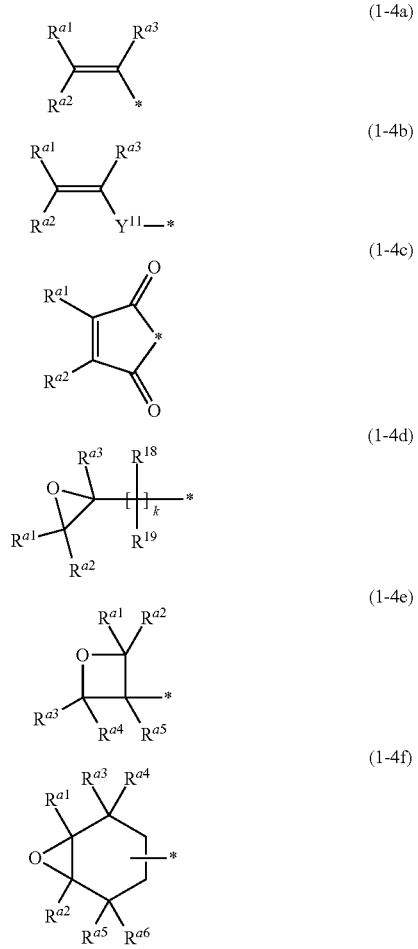

In Chemical Formulae (1-4a) to (1-4f),

* indicates a position of bonding to Chemical Formula 1, $R^{a1}$, $R^{a2}$, $R^{a3}$, $R^{a4}$, $R^{a5}$, and $R^{a6}$ are each independently hydrogen, a halogen, a C1 to C5 alkyl group, or a C1 to C5 haloalkyl group, $R^{18}$ to $R^{19}$ are independently hydrogen, a halogen, a cyano group, a nitro group, an aldehyde group, an amine group, a carboxyl group, a substituted or unsubstituted C1 to C20 alkyl group, a substituted or unsubstituted C2 to C20 alkenyl group, a substituted or unsubstituted C2 to C20 alkynyl group, a substituted or unsubstituted C2 to C20 ketone group —C(=O)$R^a$, a substituted or unsubstituted C2 to C20 ester group —C(=O)O$R^b$, a substituted or unsubstituted C3 to C30 cycloalkyl group, a substituted or unsubstituted C6 to C30 aryl group, —S(=O)$R^c$, —S(=O)O$R^d$, —S(=O)$_2R^e$, or —S(=O)$_2$O$R^f$ (wherein $R^a$ to $R^f$ are hydrogen, a C1 to C20 alkyl group, or a C6 to C30 aryl group), $Y^{11}$ is —C(=O)— or —C(=O)O—, and k is an integer of 0 to 10.

Another embodiment provides a compensation film including the polymerizable liquid crystal compound.

Yet another embodiment provides an antireflective film including the compensation film.

Still another embodiment provides a display device including the antireflective film.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
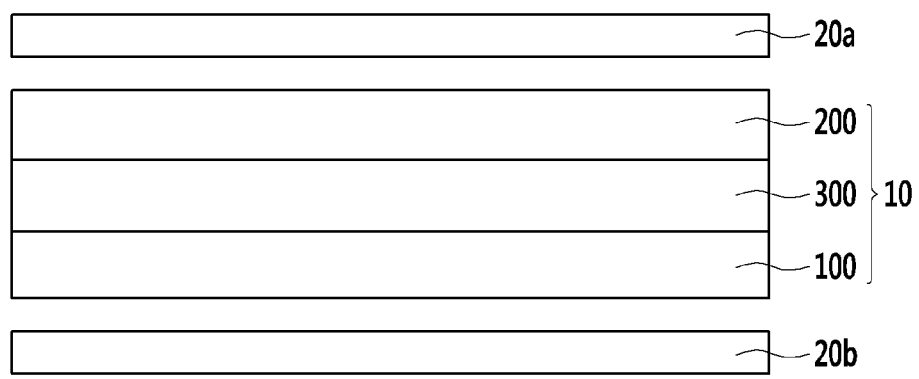
FIG. 1 is a cross-sectional view of a liquid crystal display (LCD) according to an embodiment.

Exemplary embodiments of the present inventive concept will hereinafter be described in detail, and may be easily performed by those who have common knowledge in the related art. However, this disclosure may be embodied in many different forms and is not construed as limited to the exemplary embodiments set forth herein. Rather, these embodiments are provided so that this disclosure will fully convey the scope of the disclosure to those skilled in the art. Thus, in some exemplary embodiments, well known technologies are not specifically explained to avoid ambiguous understanding of the present inventive concept. Accordingly, the exemplary embodiments are merely described below, by referring to the figures, to explain aspects of the present inventive concept. Expressions such as "at least one of," when preceding a list of elements, modify the entire list of elements and do not modify the individual elements of the list. Unless otherwise defined, all terms used in the specification (including technical and scientific terms) may be used with meanings commonly understood by a person having ordinary knowledge in the art to which this invention belongs. Further, unless explicitly defined to the contrary, the terms defined in a generally-used dictionary should be interpreted as having a meaning that is consistent with their meaning in the context of the relevant art and the present disclosure, and are not ideally or excessively interpreted. In addition, unless explicitly described to the contrary, the word "comprise" and variations such as "comprises" or "comprising", and the word "include" and variations such as "includes" or "including", when used in this specification, specify the presence of stated features, regions, integers, steps, operations, elements, and/or components, but do not preclude the presence or addition of one or more other features, regions, integers, steps, operations, elements, components, and/or groups thereof. Therefore, the above words will be understood to imply the inclusion of stated elements but not the exclusion of any other elements.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As stated above, unless specifically described to the contrary, a singular form includes a plural form.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In the drawings, parts having no relationship with the description are omitted for clarity of the embodiments, and the same or similar constituent elements are indicated by the same reference numerals throughout the specification.

As used herein, when specific definition is not otherwise provided, the term "substituted" refers to one substituted with a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamoyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof, instead of hydrogen of a compound.

As used herein, when specific definition is not otherwise provided, the term "hetero" refers to one including 1 to 3 heteroatoms selected from N, O, S, and P.

As used herein, when a definition is not otherwise provided, the term "halogen" refers to F, Cl, Br, or I.

As used herein, when a definition is not otherwise provided, the term "divalent aromatic hydrocarbon group" refers to a C6 to C40 arylene group or a C3 to C30 heteroarylene group, and the term "divalent alicyclic hydrocarbon group" refers to a C3 to C40 cycloalkylene group, a C3 to C40 cycloalkenylene group, a C3 to C40 cycloalkynylene group, a C3 to C40 heterocycloalkylene group, a C3 to C40 heterocycloalkenylene group, or a C3 to C40 heterocycloalkynylene group.

As used herein, when a definition is not otherwise provided, the term "alkyl group" refers to a group derived from a straight or branched chain saturated aliphatic hydrocarbon having the specified number of carbon atoms and having a valence of at least one.

As used herein, when a definition is not otherwise provided, the term "alkenyl group" refers to a straight or branched chain, monovalent hydrocarbon group having at least one carbon-carbon double bond.

As used herein, when a definition is not otherwise provided, the term "alkynyl group" refers to a straight or branched chain, monovalent hydrocarbon group having at least one carbon-carbon triple bond.

As used herein, when a definition is not otherwise provided, an alkyl group, an alkenyl group, or an alkynyl group may be linear or branched. Specific examples of the alkyl group may be a methyl group, an ethyl group, an isopropyl group, a tert-butyl group, an n-octyl group, an n-decyl group, an n-hexadecyl group, and the like. Specific examples of the alkenyl group may be a vinyl group, an allyl group, a 2-butenyl group, a 3-pentenyl group, and the like. Specific examples of the alkynyl group may be a propargyl group, a 3-pentynyl group, and the like.

As used herein, when a definition is not otherwise provided, the term "alkoxy group" refers to "alkyl-O—", wherein the term "alkyl" has the same meaning as described above.

As used herein, when a definition is not otherwise provided, the term "cycloalkyl group" refers to a monovalent group having one or more saturated rings in which all ring members are carbon.

As used herein, when a definition is not otherwise provided, the term "aryl", which is used alone or in combination, refers to an aromatic hydrocarbon containing at least one ring and having the specified number of carbon atoms. The term "aryl" may be construed as including a group with an aromatic ring fused to at least one cycloalkyl ring.

As used herein, when a definition is not otherwise provided, the term "arylalkyl" refers to an alkyl group substituted with an aryl group.

As used herein, when a definition is not otherwise provided, the term "heteroaryl" refers to a functional group obtained by removal of a hydrogen from an aromatic ring, containing one to three heteroatoms selected from the group consisting of N, O, S, Si, and P as ring-forming elements, and optionally substituted with one or more substituents where indicated.

As used herein, when a definition is not otherwise provided, the term "heteroarylalkyl" refers to an alkyl group substituted with a heteroaryl group.

As used herein, the terms "alkylene", "cycloalkylene", "arylene", and "heteroarylene" refer to a divalent group respectively derived from an alkyl group, a cycloalkyl group, an aryl group, and a heteroaryl group as defined above.

As used herein, when a definition is not otherwise provided, the term "amine group" refers to group having formula NRR' wherein R and R' are independently hydrogen, a C1 to C20 alkyl group, or a C6 to C30 aryl group.

Hereinafter, a polymerizable liquid crystal compound according to an embodiment is described.

A polymerizable liquid crystal compound according to an embodiment is represented by Chemical Formula 1.

In the above Chemical Formula 1

A is a substituted or unsubstituted divalent aromatic hydrocarbon group or a substituted or unsubstituted divalent alicyclic hydrocarbon group, $L^1$ and $L^2$ are each independently a substituted or unsubstituted divalent aliphatic hydrocarbon group, a substituted or unsubstituted divalent aromatic hydrocarbon group, a substituted or unsubstituted divalent alicyclic hydrocarbon group, or a combination thereof, n1 and n2 are each independently an integer of 0 or 1, $A^1$ and $A^2$ are each independently a substituted or unsubstituted divalent aliphatic hydrocarbon group, for example $(CRR'_2)_n$ (wherein R and R' are independently hydrogen or a C1 to C10 alkyl group, and n is an integer of 1 to 10), $R^1$ to $R^8$ are independently hydrogen, a halogen, a cyano group, a nitro group, an aldehyde group, an amine group, a carboxyl group, a substituted or unsubstituted C1 to C20 alkyl group, a substituted or unsubstituted C2 to C20 alkenyl group, a substituted or unsubstituted C2 to C20 alkynyl group, a substituted or unsubstituted C2 to C20 ketone group —C(=O)$R^a$, a substituted or unsubstituted C2 to C20 ester group —C(=O)O$R^b$, a substituted or unsubstituted C3 to C30 cycloalkyl group, a substituted or unsubstituted C6 to C30 aryl group, —S(=O)$R^c$, —S(=O)O$R^d$, —S(=O)$_2R^e$, or —S(=O)$_2$O$R^f$ (wherein $R^a$ to $R^f$ are hydrogen, a C1 to C20 alkyl group, or a C6 to C30 aryl group), $R^{10}$ to $R^{13}$ are independently hydrogen, a halogen, a cyano group, a nitro group, an aldehyde group, a substituted or unsubstituted C1 to C20 alkyl group, a substituted or unsubstituted C2 to C20 alkenyl group, a substituted or unsubstituted C2 to C20 alkynyl group, a substituted or unsubstituted C2 to C20 ketone group —C(=O)$R^a$, a substituted or unsubstituted C2 to C20 ester group —C(=O)O$R^b$, a substituted or unsubstituted C3 to C30 cycloalkyl group, a substituted or unsubstituted C6 to C30 aryl group, —S(=O)$R^c$, —S(=O)O$R^d$, —S(=O)$_2R^e$, or —S(=O)$_2$O$R^f$ (wherein $R^a$ to $R^f$ are hydrogen, a C1 to C20 alkyl group, or a C6 to C30 aryl group), wherein at least one pair of substituents $R^{10}$ and $R^{11}$ and substituents $R^{12}$ and $R^{13}$ optionally forms a spiro structure, $Y^1$ and $Y^2$ are each independently —O—, —S—, or —N($R^a$)— (wherein $R^a$ is hydrogen, a C1 to C20 alkyl group, or a C6 to C30 aryl group), $Y^3$, $Y^4$, $Y^5$, and $Y^6$ are each independently a linking group selected from —O—, —S—, —N($R^a$)—, —C(=O)—, —C(=O)O—, —OC(=O)—, —OC(=O)—, —C(=O)S—, —N($R^b$)C(=O)—, and —C(=O)N($R^c$)— (wherein $R^a$, $R^b$, and $R^c$ are each independently hydrogen, a C1 to C20 alkyl group, or a C6 to C30 aryl group), or a C2 to C20 alkylene group wherein non-adjacent —(CH$_2$)— is replaced by at least one of the linking groups, n1 and n2 are each independently an integer of 0 or 1, and Chemical Formula 1

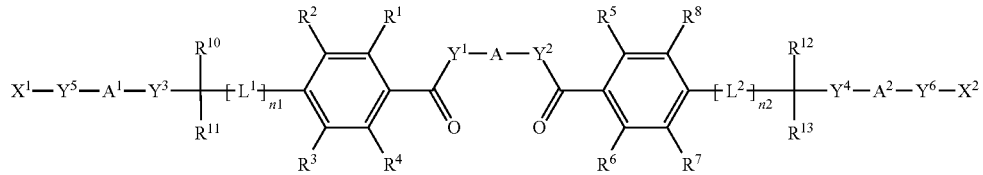

$X^1$ and $X^2$ are each independently a polymerizable functional group.

The polymerizable liquid crystal compound represented by the above Chemical Formula 1 is a rod-shaped mesogenic compound and has a kink structure due to the presence of a functional group represented by —C($R^{10}$)($R^{11}$)— and —C($R^{12}$)($R^{13}$)—. Thus, the polymerizable liquid compound may have excellent solubility in an organic solvent and improved film workability.

Specific examples of the group A may be a functional group represented by Chemical Formula 1-1.

Chemical Formula 1-1

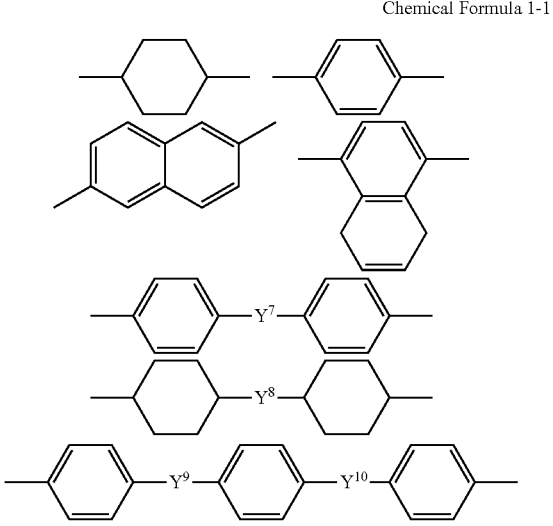

In Chemical Formula 1-1, any hydrogen of each cyclohexylene ring, phenylene ring, and naphthalene ring may be replaced by a halogen, a cyano group, a nitro group, an aldehyde group, an amine group, a carboxyl group, a substituted or unsubstituted C1 to C20 alkyl group, a substituted or unsubstituted C2 to C20 alkenyl group, a substituted or unsubstituted C2 to C20 alkynyl group, a substituted or unsubstituted C2 to C20 ketone group —C(═O)$R^a$, a substituted or unsubstituted C2 to C20 ester group —C(═O)O$R^b$, a substituted or unsubstituted C3 to C30 cycloalkyl group, a substituted or unsubstituted C6 to C30 aryl group, —S(═O)$R^c$, —S(═O)O$R^d$, —S(═O)$_2R^e$, or —S(═O)$_2$O$R^f$ (wherein $R^a$ to $R^f$ are hydrogen, a C1 to C20 alkyl group, or a C6 to C30 aryl group), at least one of non-adjacent —(CH$_2$)— of each cyclohexylene ring may be replaced by —O—, —S—, or —N($R^a$)— (wherein $R^a$ is hydrogen, a C1 to C20 alkyl group, or a C6 to C30 aryl group), and at least one of non-adjacent —CH═ of each phenylene ring or naphthalene ring may be replaced by —N═, and $Y^7$, $Y^8$, $Y^9$, and $Y^{10}$ are independently a linking group selected from a single bond, —C($R^x$)═C($R^y$)-(wherein $R^x$ and $R^y$ are each independently hydrogen, a C1 to C20 alkyl group, or a C6 to C30 aryl group), —C≡C—, —O—, —S—, —N($R^a$)—, —C(═O)—, —C(═O)O—, —OC(═O)—, —OC(═O)—, —C(═O)S—, —N($R^b$)C(═O)—, and —C(═O)N($R^c$)— (wherein $R^a$ to $R^c$ are hydrogen, a C1 to C20 alkyl group, or a C6 to C30 aryl group), or a C2 to C20 alkylene group wherein non-adjacent —(CH$_2$)— is replaced by at least one of the linking groups.

In Chemical Formula 1-1, the substituted or unsubstituted C2 to C20 alkenyl group, or the substituted or unsubstituted C2 to C20 alkynyl group optionally replacing hydrogen in each cyclohexylene ring, phenylene ring, and naphthalene ring, is independently —C($R^x$)═C($R^y$)($R^z$) or —C≡C($R^x$), wherein $R^x$, $R^y$, and $R^z$ are each independently hydrogen, a C1 to C20 alkyl group, or a C6 to C30 aryl group.

Specific examples of the $L^1$ and $L^2$ may be a functional group represented by Chemical Formula 1-2.

Chemical Formula 1-2

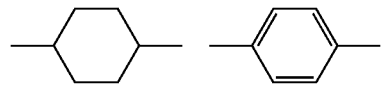

In Chemical Formula 1-2, any hydrogen of each cyclohexylene ring and phenylene ring may be replaced by a halogen, a cyano group, a nitro group, an aldehyde group, amine group, a carboxyl group, a substituted or unsubstituted C1 to C20 alkyl group, a substituted or unsubstituted C2 to C20 alkenyl group, a substituted or unsubstituted C2 to C20 alkynyl group, a substituted or unsubstituted C2 to C20 ketone group —C(═O)$R^a$, a substituted or unsubstituted C2 to C20 ester group —C(═O)O$R^b$, a substituted or unsubstituted C3 to C30 cycloalkyl group, a substituted or unsubstituted C6 to C30 aryl group, —S(═O)$R^c$, —S(═O)O$R^d$, —S(═O)$_2R^e$, or —S(═O)$_2$O$R^f$ (wherein $R^a$ to $R^f$ are hydrogen, a C1 to C20 alkyl group, or a C6 to C30 aryl group), and at least one of non-adjacent —(CH$_2$)— of each cyclohexylene ring may be replaced by —O—, —S—, or —N($R^a$)— (wherein $R^a$ is hydrogen, a C1 to C20 alkyl group, or a C6 to C30 aryl group), and at least one of non-adjacent —CH═ of each phenylene ring or naphthalene ring may be replaced by —N═.

$A^1$ and $A^2$ are a substituted or unsubstituted divalent aliphatic hydrocarbon group, for example (CRR'$_2$)$_n$ (wherein R and R' are independently hydrogen or a C1 to C10 alkyl group, and n is an integer of 1 to 10).

In Chemical Formula 1, the —C($R^{10}$)($R^{11}$)— and —C($R^{12}$)($R^{13}$)— are each a substituted or unsubstituted methylene group, and may provide the polymerizable liquid crystal compound with structural variability, and thus improved solubility in an organic solvent.

Specific examples of the substituted or unsubstituted methylene group may be a functional group represented by Chemical Formula 1-3.

Chemical Formula 1-3

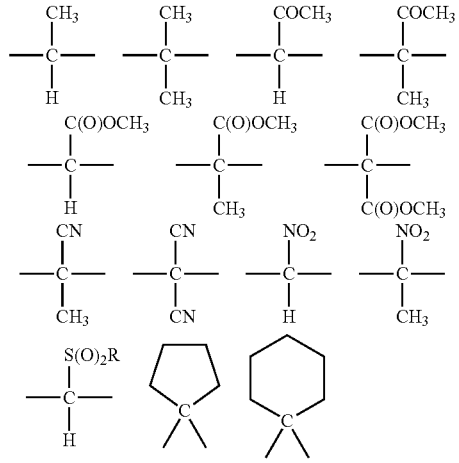

In Chemical Formula 1, the polymerizable functional group is not particularly limited, and may be a radical polymerizable functional group. Specific examples may be a substituted or unsubstituted C2 to C10 alkenyl group (e.g., a substituted or unsubstituted vinyl group or allyl group), a substituted or unsubstituted C2 to C10 alkynyl group, a substituted or unsubstituted oxetanyl group, a substituted or unsubstituted (meth)acryl group, a substituted or unsubstituted (meth)acryloyloxy group, a substituted or unsubstituted (meth)acryloylamino group, a substituted or unsubstituted (meth)acryloyl group, a substituted or unsubstituted maleoyl group, a substituted or unsubstituted epoxy group, a substituted or unsubstituted oxytanyl group, or a substituted or unsubstituted epoxy cycloalkyl group.

Specific examples of the polymerizable functional group may be a functional group represented by Chemical Formulae (1-4a) to (1-4f).

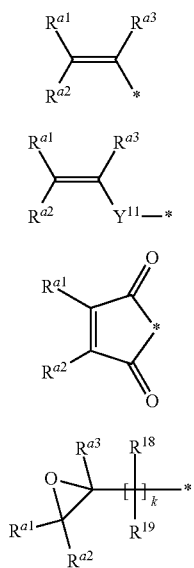

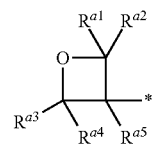

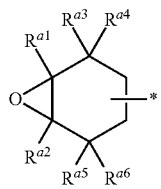

In Chemical Formulae (1-4a) to (1-4f),

* indicates a position of bonding to Chemical Formula 1, $R^{a1}$, $R^{a2}$, $R^{a3}$, $R^{a4}$, $R^{a5}$, and $R^{a6}$ are each independently hydrogen, a halogen, a C1 to C5 alkyl group, or a C1 to C5 haloalkyl group, $R^{18}$ to $R^{19}$ are independently hydrogen, a halogen, a cyano group, a nitro group, an aldehyde group, an amine group, a carboxyl group, a substituted or unsubstituted C1 to C20 alkyl group, a substituted or unsubstituted C2 to C20 alkenyl group, a substituted or unsubstituted C2 to C20 alkynyl group, a substituted or unsubstituted C2 to C20 ketone group —C(=O)$R^a$, a substituted or unsubstituted C2 to C20 ester group —C(=O)O$R^b$, a substituted or unsubstituted C3 to C30 cycloalkyl group, a substituted or unsubstituted C6 to C30 aryl group, —S(=O)$R^c$, —S(=O)O$R^d$, —S(=O)$_2R^e$, or —S(=O)$_2$O$R^f$ (wherein $R^a$ to $R^f$ are hydrogen, a C1 to C20 alkyl group, or a C6 to C30 aryl group), $Y^{11}$ is —C(=O)— or —C(=O)O—, and k is an integer of 0 to 10.

The compound represented by the above Chemical Formula 1 may be prepared by reacting Reactant I having reactive functional groups $Z^1$ and $Z^2$ at each of the terminal ends and Reactant II having a reactive functional group $Z^3$ at the terminal end thereof as shown in Reaction Scheme 1.

Reaction Scheme 1

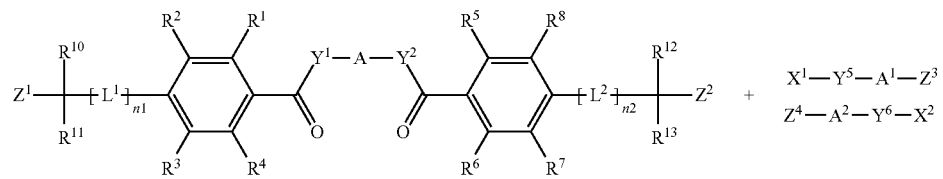

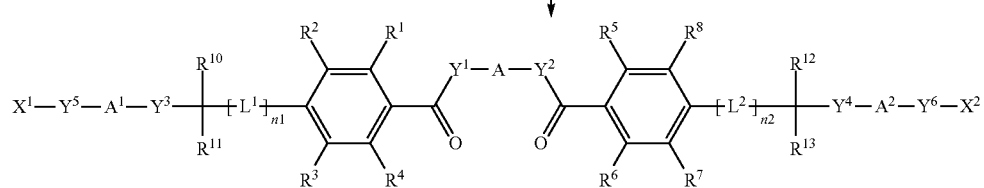

In Reaction Scheme 1, each substituent is the same as in Chemical Formula 1, and $Z^1$ and $Z^2$ may be respectively selected as a functional group reacting with $Z^3$ and $Z^4$. Examples of the Reactant II may be a carbothioic acid, a carbodithioic acid, an alcohol, an amine, an aniline, a thiol, a thiophene, and the like. Accordingly, examples of the $Z^3$ and $Z^4$ may be SH, OH, or $NH_2$, and the $Z^1$ and $Z^2$ may be selected corresponding to them. Herein, the $Z^1$ and $Z^2$ may be, for example, an OH or alkoxy group, while the $Z^3$ and $Z^4$ may be a carboxyl group, but in another embodiment, the $Z^1$ and $Z^2$ may be an OH or alkoxy group, while the $Z^3$ and $Z^4$ may be carbonyl chloride. The Reactant I and the Reactant II may be used in an equivalent ratio of 1:2, and the Reactant II may be bonded to the terminal of the Reactant I. The $Z^1$ and $Z^3$ and the $Z^2$ and $Z^3$ are reacted and respectively produce a linking group of $Y^3$ and $Y^4$.

As shown in Reaction Scheme 1, various $X^1$—$Y^5$-$A^1$-$Y^3$ structures and $X^2$—$Y^6$-$A^2$-$Y^4$ structures may be readily introduced, and thus, a resulting compound having various structures may be obtained.

Another embodiment provides a compensation film formed by polymerizing the polymerizable liquid crystal compound.

The compensation film may be formed by adding an initiator to the polymerizable liquid crystal compound to obtain a liquid crystal composition, coating the liquid crystal composition on a substrate attached with an alignment layer, and radiating light onto the coated composition or thermally curing the composition.

The compensation film may be bonded with a polarizing film and may be used as an antireflective film. The polarizing film may be formed by melt-mixing a hydrophobic polymer and a dichroic dye and elongating the melt mixture.

The antireflective film may be formed on one side or both sides of a display device, and particularly, on the screen side of the display device, and thus, the antireflective film may prevent reflection of light flowing in from the outside (hereinafter called "reflection of external light"). The antireflective film may prevent visibility deterioration due to the light flowing in from the outside.

The display device may be, for example, an organic light emitting diode (OLED) display or a liquid crystal display (LCD), but is not limited thereto.

According to an embodiment, the display device includes a display panel and the aforementioned antireflective film formed on at least one side of the display panel.

The display panel may include, for example, two substrates facing each other and an active layer disposed therebetween. For example, the display panel may be a liquid crystal panel or an organic light emitting panel.

FIG. 1 is a cross-sectional view showing a liquid crystal display (LCD) according to an embodiment.

Referring to FIG. 1, a liquid crystal display (LCD) includes a liquid crystal panel 10 and antireflective films 20a and 20b disposed on the lower part and the upper part of the liquid crystal panel 10, respectively.

The liquid crystal panel 10 may be a twist nematic (TN) mode panel, a patterned vertical alignment (PVA) mode panel, an in-plane switching (IPS) mode panel, an optically compensated bend (OCB) mode panel, and the like.

The liquid crystal display panel 10 includes a first display panel 100, a second display panel 200, and a liquid crystal layer 300 interposed between the first display panel 100 and the second display panel 200.

The first display panel 100 may include, for example, a thin film transistor (not shown) formed on a substrate (not shown), and a first field generating electrode (not shown) connected thereto. The second display panel 200 may include, for example, a color filter (not shown) formed on the substrate and a second field generating electrode (not shown). However, it is not limited thereto, and the color filter may be included in the first display panel 100; and both the first field generating electrode and the second field generating electrode may be disposed in the first display panel 100.

The liquid crystal layer 300 may include a plurality of liquid crystal molecules. The liquid crystal molecules may have positive or negative dielectric anisotropy. When the liquid crystal molecules have positive dielectric anisotropy, the long axes thereof may be aligned substantially parallel to the surface of the first display panel 100 and the second display panel 200 when an electric field is not applied, and may be aligned substantially perpendicular to the surface of the first display panel 100 and the second display panel 200 when an electric field is applied. On the contrary, when the liquid crystal molecules have negative anisotropy, the long axes thereof may be aligned substantially perpendicular to the surface of the first display panel 100 and the second display panel 200 when an electric field is not applied, and may be aligned substantially parallel to the surface of the first display panel 100 and the second display panel 200 when an electric field is applied.

The antireflective films 20a and 20b are disposed on the outside of the liquid crystal display panel 10. Although they are shown to be disposed on the upper part and lower part of the liquid crystal display panel 10 in the drawing, they may be formed on either the upper part or the lower part of liquid crystal display panel 10.

The antireflective films 20a and 20b include the compensation film prepared by polymerizing the polymerizable liquid crystal compound and a polarizing film as described above.

Even though only one example in which the antireflective film according to an embodiment is applied to a liquid crystal display (LCD) is described above, it may be equally applied to any display device including a polarizing plate or a polarizing film, for example, to an organic light emitting diode (OLED) device or the like.

Hereinafter, the present disclosure is illustrated in more detail with reference to examples. However, these examples are exemplary, and the present disclosure is not limited thereto.

Synthesis Example 1a

Preparation of Polymerizable Liquid Crystal Compound

Synthesis Example 1a-1

A diol compound (10 millimoles (mmol), 1 equivalent (eq.)) of a compound 1a-2 shown in Reaction Scheme 1a-1 is dissolved in 100 milliliters (mL) of dichloromethane (DCM), and triethylamine (22 mmol, 2.2 eq.) is added thereto. Subsequently, 4-chloromethylbenzoyl chloride (a compound 1a-2, 21 mmol, 2.1 eq.) is added thereto, while the mixture is agitated, and the obtained mixture is refluxed and agitated for one hour under a nitrogen atmosphere. When the reaction is complete, the resultant is cooled down to room temperature (24° C.), 150 mL of isopropanol is added thereto, and the mixture is distilled under a reduced pressure to remove the DCM. Then, a solid obtained therefrom is filtered and cleaned with isopropanol/n-hexane. The obtained compound 1a-3 is dried at 60° C. under a reduced pressure for 24 hours (yield: 97%).

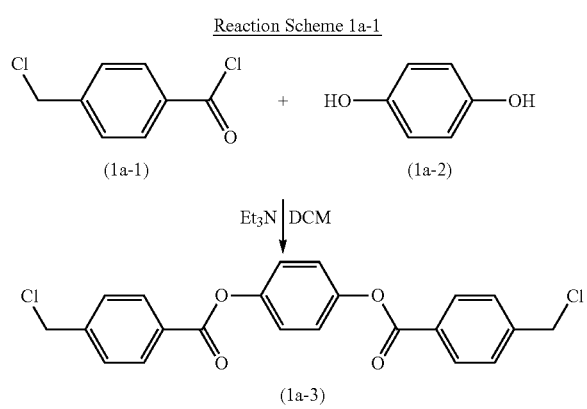

Synthesis Example 1a-2

The compound 1a-3 (10 mmol, 1 eq.) according to Synthesis Example 1a-1, a compound 1a-4 (21 mmol, 2.1 eq.), potassium hydrogen carbonate ($KHCO_3$) (30 mmol, 3 eq.), potassium iodide (KI) (1 mmol, 0.1 eq.), tetra-n-butylammonium bromide (n-$Bu_4$NBr) (0.5 mmol, 0.05 eq.), and dimethyl acetamide (DMAC) (20 mL) are agitated under a nitrogen atmosphere for 24 hours at 60° C. When the reaction is complete, the mixture is cooled down to room temperature (24° C.), and 200 mL of water is poured therein. Then, a solid obtained therefrom is filtered and washed with water. The solid is dried in the air, a small amount of charcoal is added thereto, and crystallization is performed twice using a mixture of DCM and methanol (MeOH) (1:1 volume ratio). The obtained white material is dried for 24 hours at 60° C., obtaining a liquid crystal material (a compound 1a-5) (yield: 88%).

Synthesis Example 2

Preparation of Polymerizable Liquid Crystal Compound

A diol compound (10 mmol, 1 eq.) of the compound 1b-2 in Reaction Scheme 1b is dissolved in 100 mL of dichloromethane (DCM), and triethylamine (22 mmol, 2.2 eq.) is added thereto. Then, 4-chloromethylbenzoyl chloride (a compound 1, 21 mmol, 2.1 eq.) is added thereto, while the mixture is agitated, and the obtained mixture is refluxed and agitated for one hour under a nitrogen atmosphere. When the reaction is complete, the resulting mixture is cooled down to room temperature (24° C.), 150 mL of isopropanol is added thereto, and the obtained mixture is distilled under a reduced pressure to remove the DCM. Then, a solid obtained therefrom is filtered and cleaned with isopropanol/n-hexane. The obtained compound 1b-3 is dried at 60° C. for 24 hours under a reduced pressure (yield: 95%).

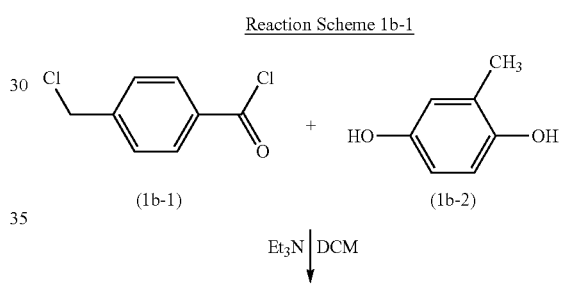

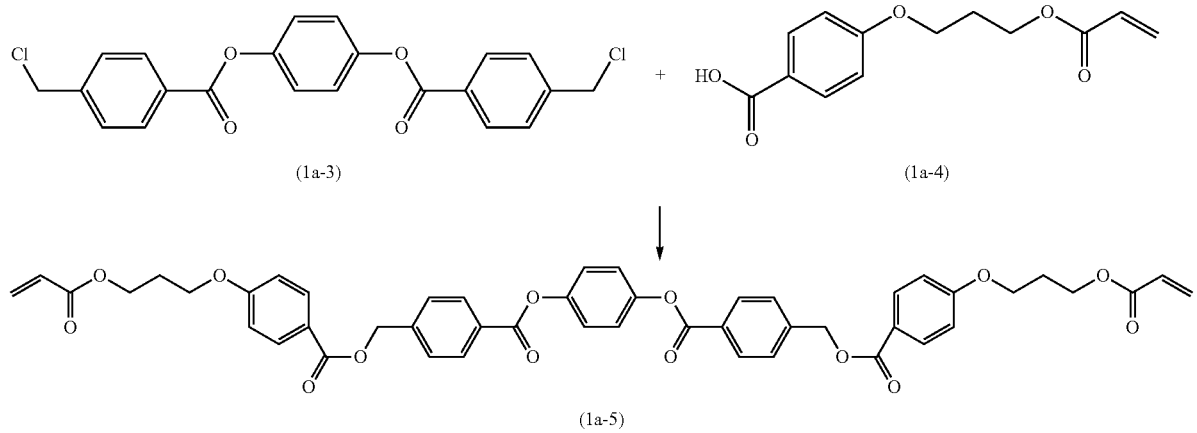

Figure 2:
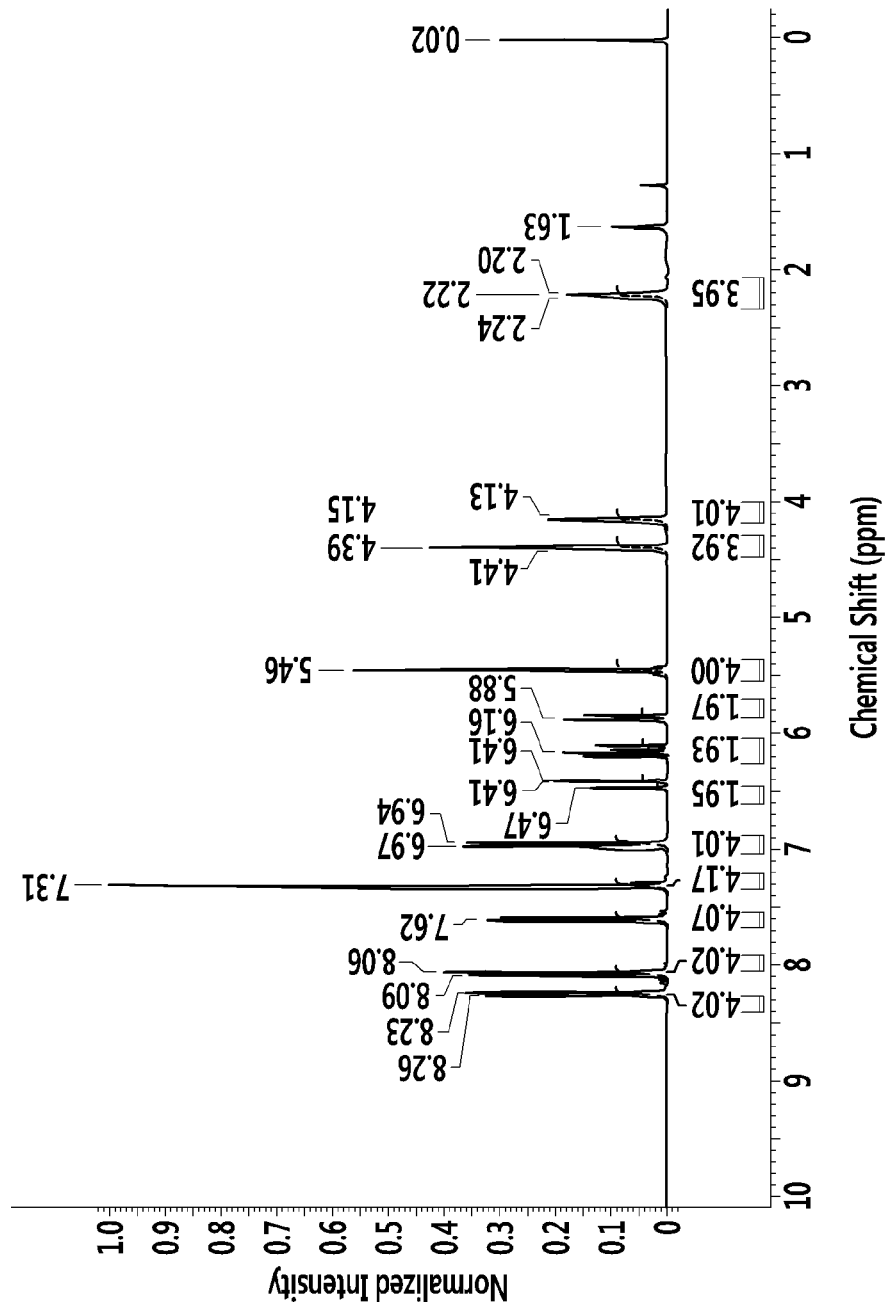
FIG. 2 is a graph of normalized intensity versus chemical shift (parts per million, ppm), which is a drawing showing the $^1$H-NMR results of a polymerizable liquid crystal compound 1a-5 prepared according to Synthesis Example 1.
Figure 3:
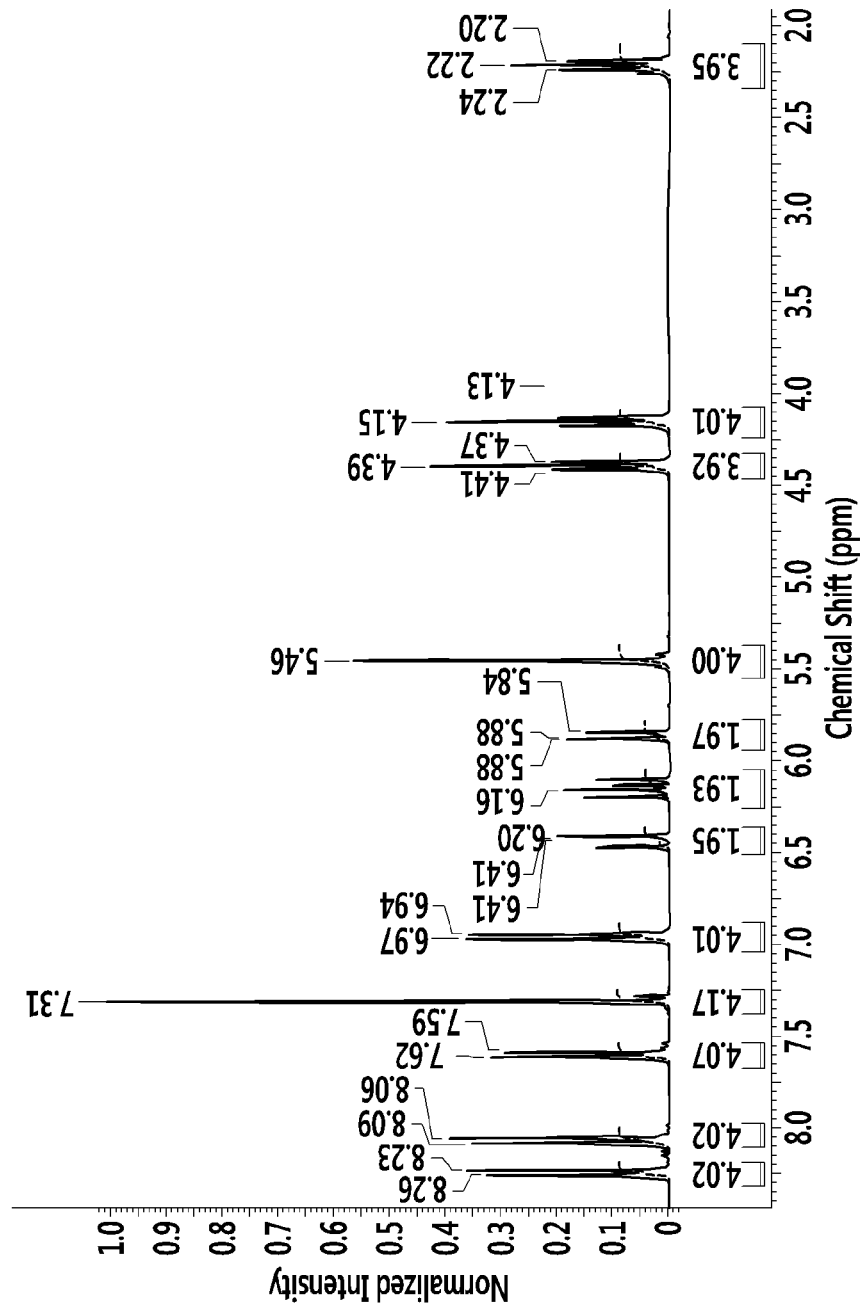
FIG. 3 is a graph of normalized intensity versus chemical shift (parts per million, ppm), which is a drawing enlarging a partial section of the spectrum shown in FIG. 2.

The $^1$H-NMR results (DMSO-$d_6$, 300 MHz) of the polymerizable liquid crystal compound 1a-5 obtained in Synthesis Example 1 are provided in FIGS. 2 and 3. FIG. 2 is a drawing showing $^1$H-NMR results of the polymerizable liquid crystal compound 1a-5 according to Synthesis Example 1, and FIG. 3 is a drawing enlarging a partial section of the spectrum shown in FIG. 2.

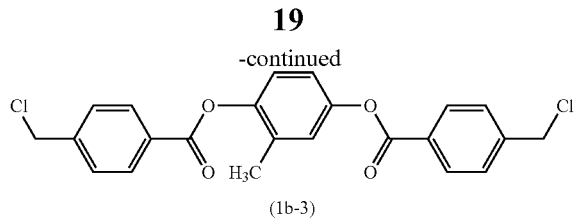

(1b-3)

Synthesis Example 1 b-2

The compound 1b-3 (10 mmol, 1 eq.) according to Synthesis Example 1b-1, a compound 1b-4 (21 mmol, 2.1 eq.), potassium hydrogen carbonate (KHCO$_3$) (30 mmol, 3 eq.), potassium iodide (KI) (1 mmol, 0.1 eq.), tetra-n-butylammonium bromide (n-Bu$_4$NBr) (0.5 mmol, 0.05 eq.) and dimethyl acetamide (DMAC) (20 mL) are agitated for 24 hours at 60° C. under a nitrogen atmosphere. When the reaction is complete, the obtained mixture is cooled down to room temperature (24° C.), and 200 mL of water is poured therein. Then, a solid obtained therefrom is washed with water. The solid is dried in the air, a small amount of charcoal is added thereto, and crystallization is performed twice using a mixture of DCM and methanol (MeOH) (1:1 volume ratio). The obtained white material is dried at 60° C. for 24 hours, obtaining a liquid crystal material (a compound 1b-5) (yield: 75%).

Figure 4:
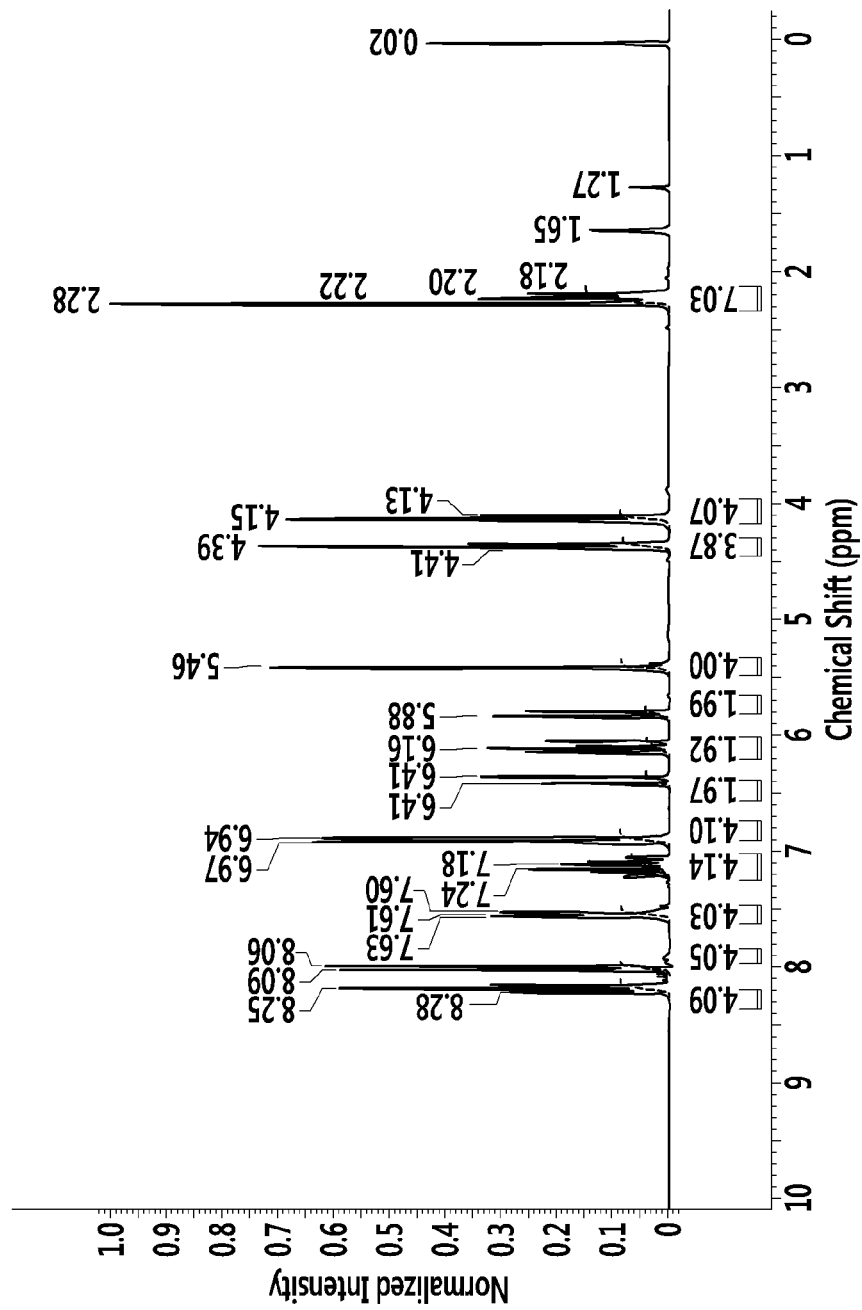
FIG. 4 is a graph of normalized intensity versus chemical shift (parts per million, ppm), which is a drawing showing the $^1$H-NMR results of a polymerizable liquid crystal compound 1b-5 prepared according to Synthesis Example 2.
Figure 5:
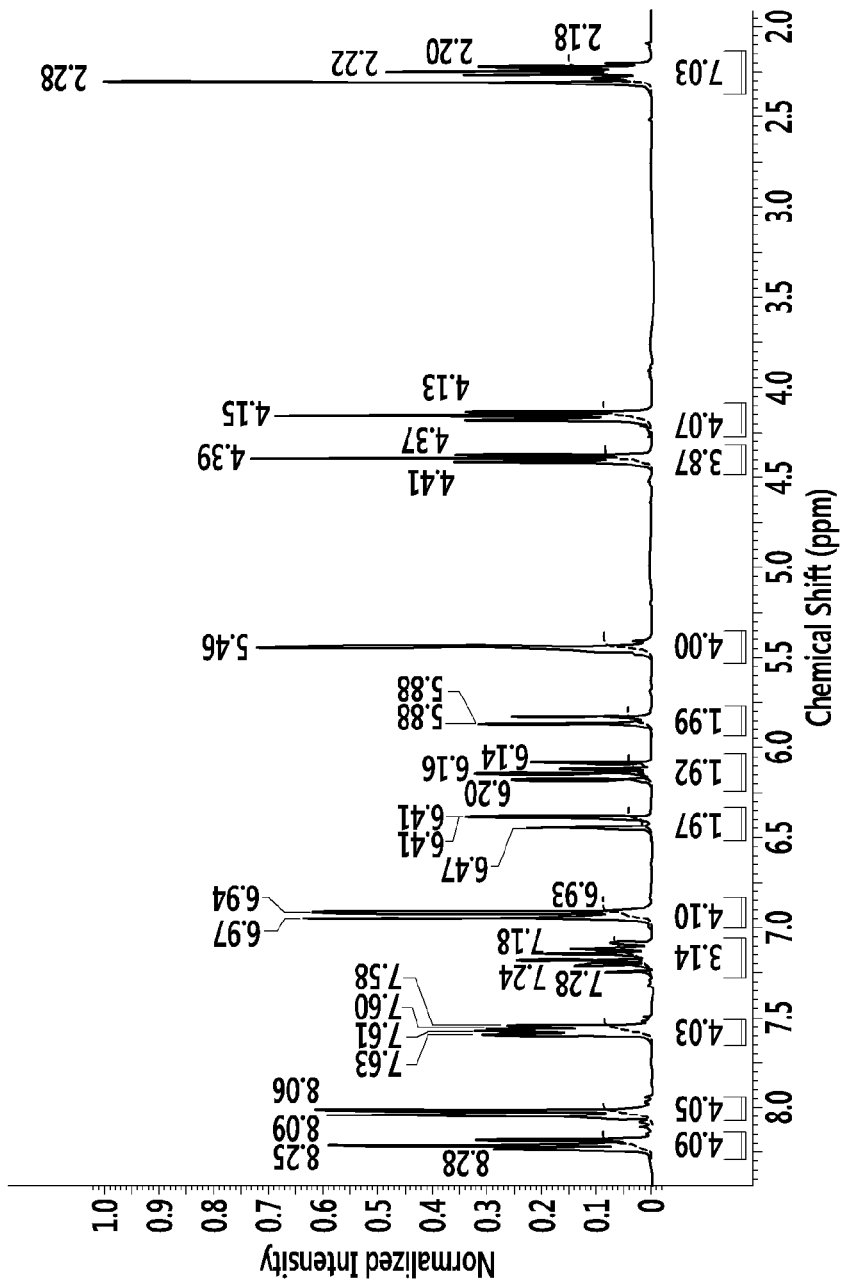
FIG. 5 is a graph of normalized intensity versus chemical shift (parts per million, ppm), which is a drawing enlarging a partial section of the spectrum shown in FIG. 4.

Synthesis Example 2 are provided in FIGS. 4 and 5. FIG. 4 is a drawing showing the $^1$H-NMR results of the polymerizable liquid crystal compound 1b-5 according to Synthesis Example 2, and FIG. 5 is a drawing enlarging a partial section in FIG. 4.

Synthesis Example 3

Preparation of Polymerizable Liquid Crystal Compound

The compound 1a-3 (10 mmol, 1 eq.) according to Synthesis Example 1a-1, a compound 1a-6 (21 mmol, 2.1 eq.), potassium hydrogen carbonate (KHCO$_3$) (30 mmol, 3 eq.), potassium iodide (KI) (1 mmol, 0.1 eq.), tetra-n-butylammonium bromide (n-Bu$_4$NBr) (0.5 mmol, 0.05 eq.), and dimethyl acetamide (DMAC) (20 mL) are agitated at 60° C. for 24 hours under a nitrogen atmosphere. When the reaction is complete, the mixture is cooled down to room temperature (24° C.), and 200 mL of water is poured therein. Then, a solid obtained therefrom is washed with water. The solid is dried in the air, a small amount of charcoal is added thereto, and crystallization is performed twice using a mixture of DCM and methanol (MeOH) (1:1 volume ratio). The obtained white material is dried at 60° C. for 24 hours, obtaining a liquid crystal material (a compound 1a-7) (yield: 82%).

Reaction Scheme 1b-2

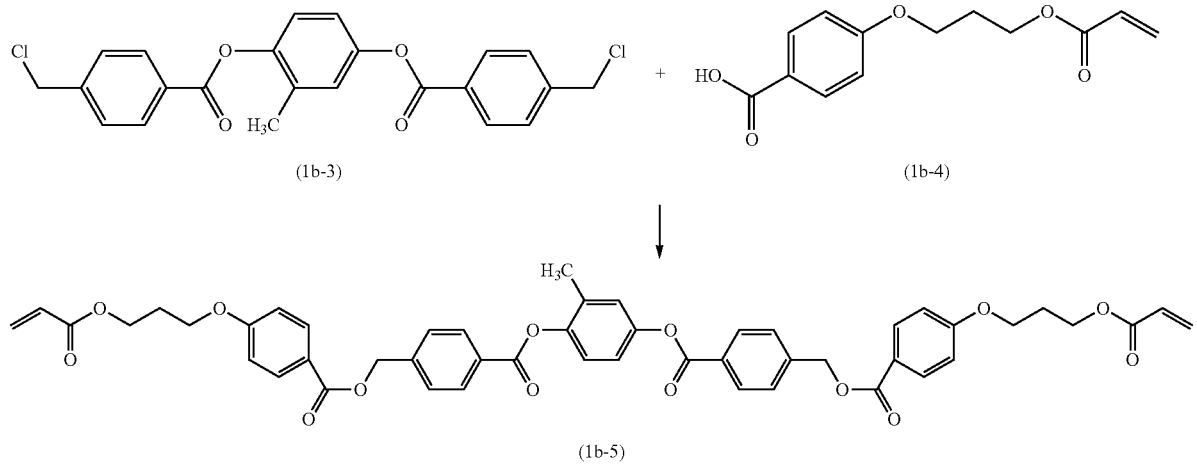

The $^1$H-NMR results (DMSO-d$_6$, 300 MHz) of the polymerizable liquid crystal compound 1b-5 according to Reaction Scheme 1a-3

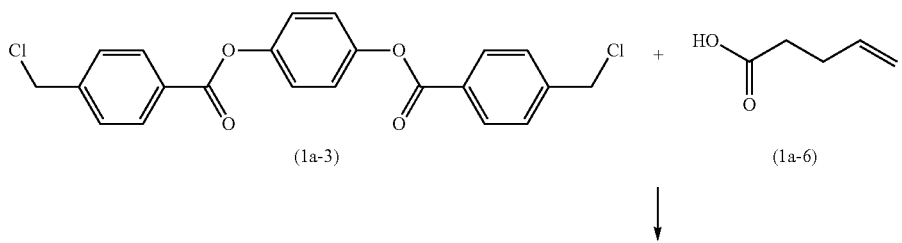

-continued

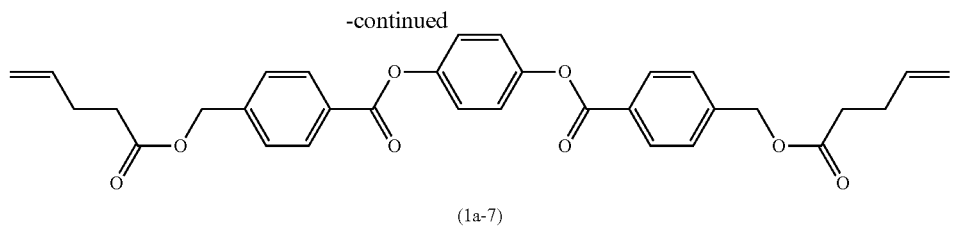

(1a-7)

Figure 6:
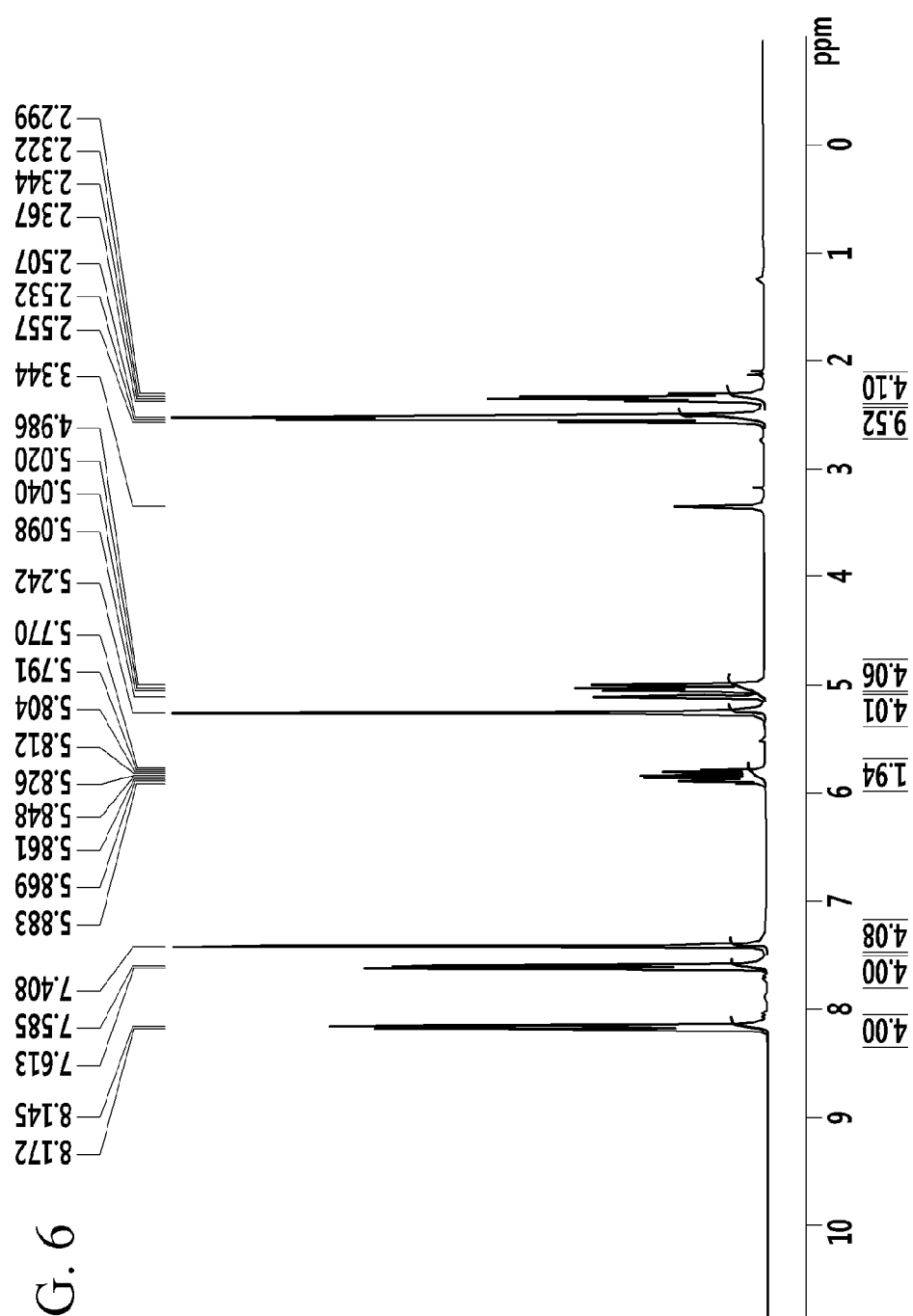
FIG. 6 is a graph of normalized intensity versus chemical shift (parts per million, ppm), which is a drawing showing the $^1$H-NMR results of a polymerizable liquid crystal compound 1a-7 prepared according to Synthesis Example 3.

The $^1$H-NMR results (DMSO-$d_6$, 300 MHz) of the polymerizable liquid crystal compound 1a-7 according to Synthesis Example 3 are provided in FIG. 6.

The compounds according to Synthesis Examples 1 to 3 and commercially available mesogen are respectively added to 100 mL of toluene, and saturation solubility of the compounds is measured based on 100% saturation solubility of the mesogen and provided in the Table 1.

TABLE 1

| Liquid crystal compound | Relative saturation solubility in toluene |
| --- | --- |
| Compound 1a-5 of Synthesis Example 1 | 152% |
| Compound 1b-5 of Synthesis Example 2 | 175% |
| Compound 1a-7 of Synthesis Example 3 | 150% |
| Commercial mesogen (Paliocolor LC 242, BASF) | 100% |

Figure 7:
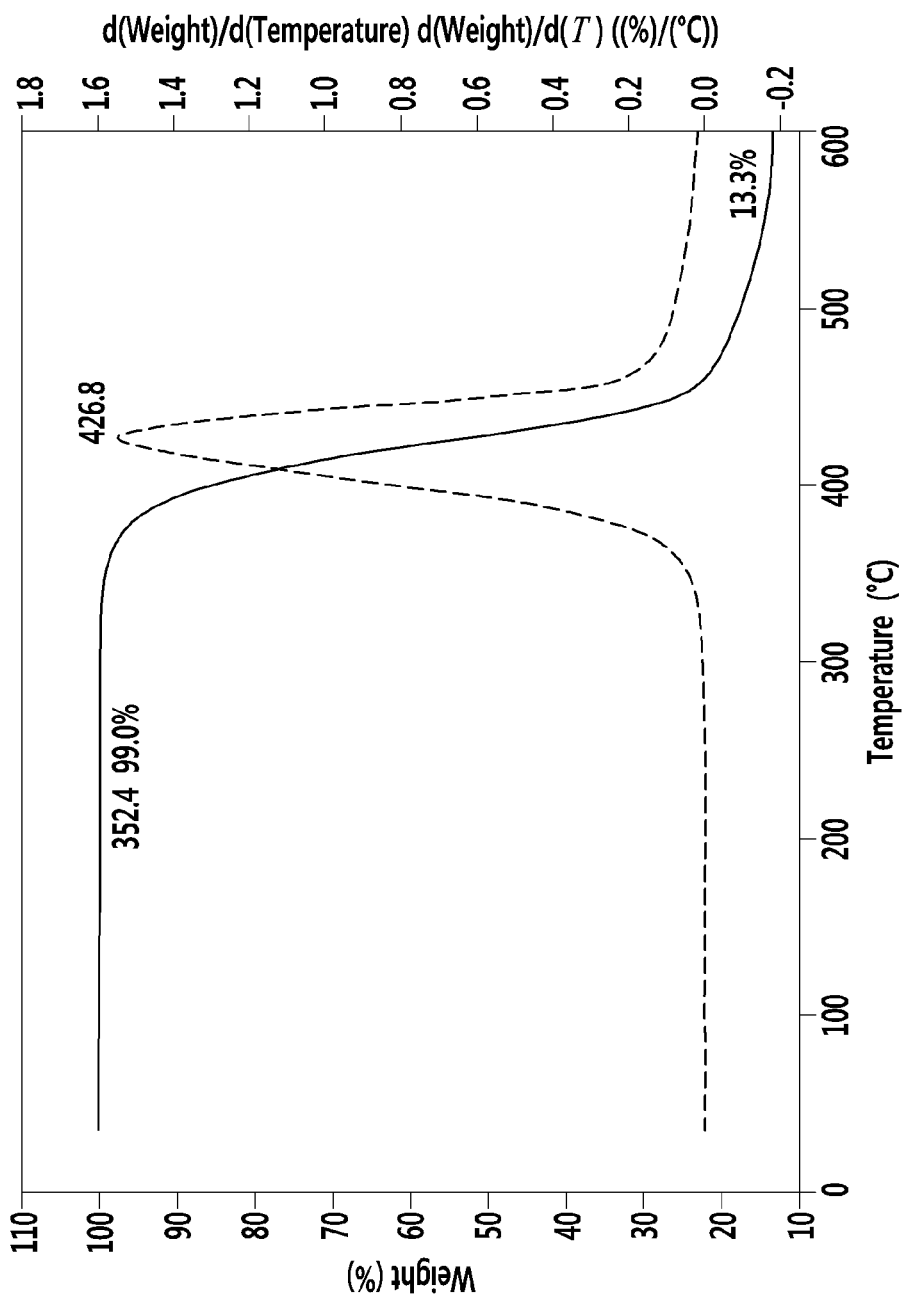
FIG. 7 is a graph of weight (percent, %) and d(weight)/d(temperature) (percent per degree Centigrade, %/° C.) versus temperature (degree Centigrade, ° C.), which is a drawing showing thermogravimetric analysis results of the polymerizable liquid crystal compound prepared according to Synthesis Example 1.

Thermogravimetric analysis (TGA) and differential scanning calorimetry (DSC) analysis of the polymerizable liquid crystal compound according to Synthesis Example 1 are performed by using Trios V3.0 (TA Instrument, 10° C./min, N$_2$ atmosphere). The results are respectively provided in FIGS. 7 and 8. FIG. 7 is a drawing showing the thermogravimetric analysis of the polymerizable liquid crystal compound 1a-5 according to Synthesis Example 1, and FIG. 8 is a drawing showing the differential scanning calorimetry (DSC) analysis of the polymerizable liquid crystal compound 1a-5 according to Synthesis Example 1.

Referring to FIG. 7, the polymerizable liquid crystal compound 1a-5 of Synthesis Example 1 is decomposed at a temperature of greater than or equal to 300° C. Accordingly, the polymerizable liquid crystal compound 1a-5 of Synthesis Example 1 shows excellent thermal stability.

Figure 8:
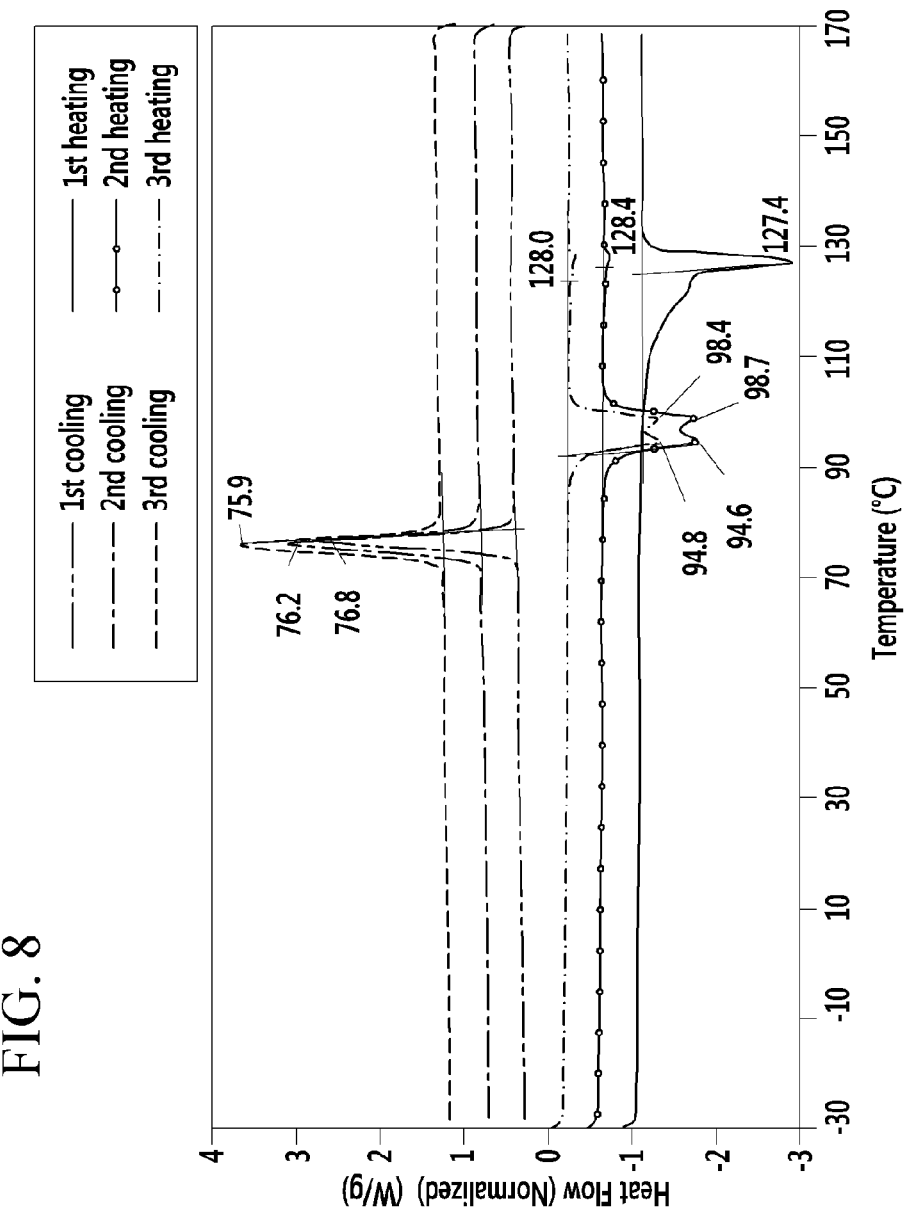
FIG. 8 is a graph of normalized heat flow (Watts per gram) versus temperature (degree Centigrade, ° C.), which is a drawing showing differential scanning calorimetry (DSC) analysis results of the polymerizable liquid crystal compound according to Synthesis Example 1.

In addition, referring to FIG. 8, the compound 1a-5 according to Synthesis Example 1 turns out to have a liquid crystal from a first peak (94.6° C., 98.7° C., 49.0 Joules per gram (J/g)) and a second peak (128.0° C., 2.0 J/g) in a $2^{nd}$ heating curve. Accordingly, the compound 1a-5 may be used to form an optical film such as a compensation film and the like.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present inventive concept in any way.

What is claimed is:

1. A polymerizable liquid crystal compound represented by Chemical Formula 1:

Chemical Formula 1 wherein, in Chemical Formula 1,

A is a phenylene group or a phenylene group substituted with a C1 to C20 alkyl group, L$^1$ and L$^2$ are each independently a substituted or unsubstituted divalent aliphatic hydrocarbon group, a substituted or unsubstituted divalent aromatic hydrocarbon group, a substituted or unsubstituted divalent alicyclic hydrocarbon group, or a combination thereof, n1 and n2 are each independently an integer of 0 or 1, A$^1$ and A$^2$ are each independently (CRR'$_2$)$_n$ (wherein R and R' are independently hydrogen or a C1 to C10 alkyl group, and n is an integer of 1 to 10) or a phenylene group, R$^1$ to R$^8$ are independently hydrogen, a halogen, a cyano group, a nitro group, an aldehyde group, an amine group, a carboxyl group, a substituted or unsubstituted C1 to C20 alkyl group, a substituted or unsubstituted C2 to C20 alkenyl group, a substituted or unsubstituted C2 to C20 alkynyl group, a substituted or unsubstituted C2 to C20 ketone group —C(=O)R$^a$, a substituted or unsubstituted C2 to C20 ester group —C(=O)OR$^b$, a substituted or unsubstituted C3 to C30 cycloalkyl group, a substituted or unsubstituted C6 to C30 aryl group, —S(=O)R$^c$, —S(=O)OR$^d$, —S(=O)$_2$R$^e$, or —S(=O)$_2$OR$^f$ (wherein R$^a$ to R$^f$ are hydrogen, a C1 to C20 alkyl group, or a C6 to C30 aryl group), R$^{10}$ to R$^{13}$ are independently hydrogen, a halogen, a cyano group, a nitro group, an aldehyde group, a substituted or unsubstituted C1 to C20 alkyl group, a substituted or unsubstituted C2 to C20 alkenyl group, a substituted or unsubstituted C2 to C20 alkynyl group, a substituted or unsubstituted C2 to C20 ketone group —C(=O)R$^a$, a substituted or unsubstituted C2 to C20 ester group —C(=O)OR$^b$, a substituted or unsubstituted C3 to C30 cycloalkyl group, a substituted or unsubstituted C6 to C30 aryl group, —S(=O)R$^c$, —S(=O)OR$^d$, —S(=O)$_2$R$^e$, or —S(=O)$_2$OR$^f$ (wherein R$^a$ to R$^f$ are hydrogen, a C1 to C20 alkyl group, or a C6 to C30 aryl group), wherein at least one pair of substituents $R^{10}$ and $R^{11}$ and substituents $R^{12}$ and $R^{13}$ optionally forms a spiro structure, $Y^1$ and $Y^2$ are each independently —O—, —S—, or —N($R^a$)— (wherein $R^a$ is hydrogen, a C1 to C20 alkyl group, or a C6 to C30 aryl group), $Y^3$ and $Y^4$ are each independently a linking group selected from —C(=O)O— and —OC(=O), $Y^5$ and $Y^6$ are each independently a linking group selected from —O—, —S—, —N($R^a$)—, —C(=O)—, —C(=O)O—, —OC(=O)—, —C(=O)S—, —N($R^b$)C(=O)—, and —C(=O)N($R^c$)— (wherein $R^a$, $R^b$, and $R^c$ are each independently hydrogen, a C1 to C20 alkyl group, or a C6 to C30 aryl group) or a C2 to C20 alkylene group wherein non-adjacent —(CH$_2$)— is replaced by at least one of the linking groups, and $X^1$ and $X^2$ are each independently a polymerizable functional group selected from a substituted or unsubstituted C2 to C10 alkenyl group, a substituted or unsubstituted C2 to C10 alkynyl group, a substituted or unsubstituted oxetanyl group, a substituted or unsubstituted (meth)acryl group, a (meth)acryloyloxy group, a (meth)acryloylamino group, a (meth)acryloyl group, a substituted or unsubstituted maleoyl group, a substituted or unsubstituted epoxy group, or a substituted or unsubstituted epoxy cycloalkyl group.

2. The polymerizable liquid crystal compound of claim 1, wherein the $L^1$ and $L^2$ are functional groups represented by Chemical Formula 1-2:

Chemical Formula 1-2

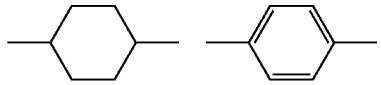

wherein, in Chemical Formula 1-2, any hydrogen of each cyclohexylene ring and phenylene ring is optionally replaced by a halogen, a cyano group, a nitro group, an aldehyde group, an amine group, a carboxyl group, a substituted or unsubstituted C1 to C20 alkyl group, a substituted or unsubstituted C2 to C20 alkenyl group, a substituted or unsubstituted C2 to C20 alkynyl group, a substituted or unsubstituted C2 to C20 ketone group —C(=O)$R^a$, a substituted or unsubstituted C2 to C20 ester group —C(=O)O$R^b$, a substituted or unsubstituted C3 to C30 cycloalkyl group, a substituted or unsubstituted C6 to C30 aryl group, —S(=O)$R^c$, —S(=O)O$R^d$, —S(=O)$_2R^e$, or —S(=O)$_2$O$R^f$ (wherein $R^a$ to $R^f$ are hydrogen, a C1 to C20 alkyl group, or a C6 to C30 aryl group), at least one of non-adjacent —(CH$_2$)— of each cyclohexylene ring is optionally replaced by —O—, —S—, or —N($R^a$)— (wherein $R^a$ is hydrogen, a C1 to C20 alkyl group, or a C6 to C30 aryl group), and at least one of non-adjacent —CH= of each phenylene ring or naphthalene ring is optionally replaced by —N=.

3. The polymerizable liquid crystal compound of claim 1, wherein in Chemical Formula 1, —C($R^{10}$)($R^{11}$)— and —C($R^{12}$)($R^{13}$)— are each a functional group represented by Chemical Formula 1-3:

Chemical Formula 1-3

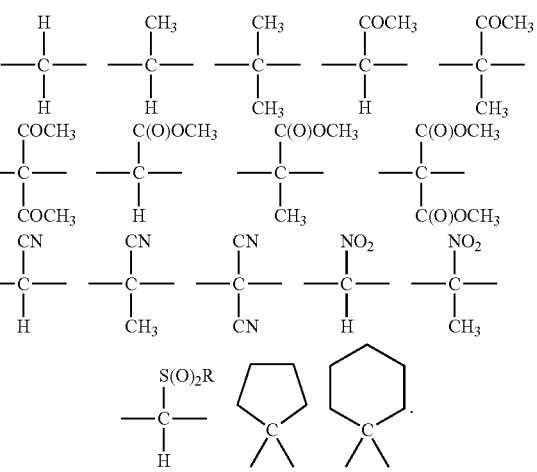

4. The polymerizable liquid crystal compound of claim 1, wherein the polymerizable functional group is a functional group represented by any of Chemical Formulae (1-4a) to (1-4f):

(1-4a)

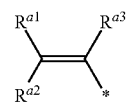

(1-4b)

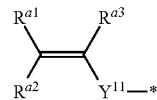

(1-4c)

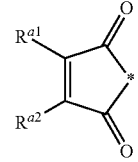

(1-4d)

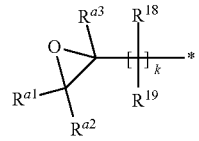

(1-4e)

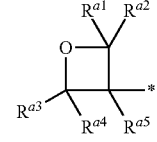

(1-4f)

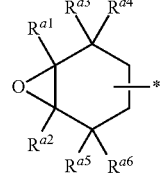

wherein, in Chemical Formulae (1-4a) to (1-4f),

* indicates a position of bonding to Chemical Formula 1, $R^{a1}$, $R^{a2}$, $R^{a3}$, $R^{a4}$, $R^{a5}$, and $R^{a6}$ are each independently hydrogen, a halogen, a C1 to C5 alkyl group, or a C1 to C5 haloalkyl group, $R^{18}$ to $R^{19}$ are independently hydrogen, a halogen, a cyano group, a nitro group, an aldehyde group, an amine group, a carboxyl group, a substituted or unsubstituted C1 to C20 alkyl group, a substituted or unsubstituted C2 to C20 alkenyl group, a substituted or unsubstituted C2 to C20 alkynyl group, a substituted or unsubstituted C2 to C20 ketone group —C(=O)$R^a$, a substituted or unsubstituted C2 to C20 ester group —C(=O)O$R^b$, a substituted or unsubstituted C3 to C30 cycloalkyl group, a substituted or unsubstituted C6 to C30 aryl group, —S(=O)$R^c$, —S(=O)O$R^d$, —S(=O)$_2R^e$, or —S(=O)$_2$O$R^f$ (wherein $R^a$ to $R^f$ are hydrogen, a C1 to C20 alkyl group, or a C6 to C30 aryl group), $Y^{11}$ is —C(=O)— or —C(=O)O—, and k is an integer of 0 to 10.

5. A compensation film comprising the polymerizable liquid crystal compound of claim 1.

6. An antireflective film comprising the compensation film of claim 5.

7. A display device comprising the antireflective film of claim 6.

* * * * *